United States Patent
Evans, V et al.

(10) Patent No.: US 9,996,158 B2
(45) Date of Patent: Jun. 12, 2018

(54) ELECTRONIC DISPLAY WITH A RELIEF

(71) Applicant: Essential Products, Inc., Palo Alto, CA (US)

(72) Inventors: David John Evans, V, Palo Alto, CA (US); Andrew E. Rubin, Los Altos, CA (US); Xinrui Jiang, San Jose, CA (US); Xiaoyu Miao, Palo Alto, CA (US); Joseph Anthony Tate, San Jose, CA (US); Matthew Hershenson, Los Altos, CA (US); Jason Sean Gagne-Keats, Cupertino, CA (US); Michael Kolb, Redwood City, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/585,146

(22) Filed: May 2, 2017

(65) Prior Publication Data

US 2018/0074586 A1    Mar. 15, 2018

Related U.S. Application Data

(63) Continuation of application No. 15/284,008, filed on Oct. 3, 2016, now Pat. No. 9,799,279.

(60) Provisional application No. 62/395,243, filed on Sep. 15, 2016.

(51) Int. Cl.
| | |
|---|---|
| G09G 5/00 | (2006.01) |
| G06F 3/01 | (2006.01) |
| H04N 1/00 | (2006.01) |
| G06F 3/041 | (2006.01) |

(52) U.S. Cl.
CPC .............. *G06F 3/016* (2013.01); *G06F 3/041* (2013.01); *H04N 1/00411* (2013.01)

(58) Field of Classification Search
CPC ...... G06F 3/016; G06F 3/041; H04N 1/00411
See application file for complete search history.

(56) References Cited

U.S. PATENT DOCUMENTS

| | | | |
|---|---|---|---|
| 6,441,449 | B1 | 8/2002 | Xu et al. |
| 7,471,031 | B2 | 12/2008 | Kawakubo et al. |
| 7,586,164 | B2 | 9/2009 | Musalem et al. |
| 8,362,882 | B2 | 1/2013 | Heubel et al. |
| 8,451,240 | B2 | 5/2013 | Pasquero et al. |
| 8,564,176 | B2 | 10/2013 | Nihei |
| 8,593,409 | B1 | 11/2013 | Bakircioglu et al. |

(Continued)

OTHER PUBLICATIONS

Non-Final Office Action dated Apr. 3, 2017 in U.S. Appl. No. 15/284,008 of Evans V et al. filed Oct. 3, 2016, 26 pages.

(Continued)

*Primary Examiner* — Peter D McLoone
(74) *Attorney, Agent, or Firm* — Perkins Coie LLP

(57) ABSTRACT

Introduced here are methods and systems to create a relief on an electronic display. In one embodiment, the relief is created by micro-electromechanical systems (MEMS) placed above a cover layer of the electronic display. Each MEMS when activated can protrude or depress, thus creating the relief on the electronic display. In another embodiment, the relief is created by a plurality of resistors placed beneath the cover layer. The cover layer is made out of an elastically deformable material that, when heated, expands, thus creating a protrusion on the electronic display. Each resistor when activated heats a section of the cover layer, causing the cover layer to protrude.

25 Claims, 16 Drawing Sheets

(56) References Cited

U.S. PATENT DOCUMENTS

| | | |
|---|---|---|
| 8,665,241 B2 | 3/2014 | Heubel et al. |
| 8,717,151 B2 | 5/2014 | Forutanpour et al. |
| 8,780,060 B2 | 7/2014 | Cameron et al. |
| 8,854,331 B2 | 10/2014 | Bakircioglu et al. |
| 8,948,706 B2 | 2/2015 | Black et al. |
| 9,405,369 B2 | 8/2016 | Levesque et al. |
| 9,557,857 B2 | 1/2017 | Schediwy et al. |
| 2002/0025595 A1 | 2/2002 | Xu et al. |
| 2005/0030292 A1 | 2/2005 | Diederiks et al. |
| 2006/0291135 A1 | 12/2006 | Musalem et al. |
| 2007/0134835 A1 | 6/2007 | Fukuda et al. |
| 2009/0002328 A1 | 1/2009 | Ullrich et al. |
| 2009/0250267 A1 | 10/2009 | Heubel et al. |
| 2010/0141407 A1 | 6/2010 | Heubel et al. |
| 2010/0238114 A1 | 9/2010 | Vartanian et al. |
| 2011/0148255 A1 | 6/2011 | Nihei et al. |
| 2011/0304558 A1 | 12/2011 | Pasquero et al. |
| 2012/0105333 A1 | 5/2012 | Maschmeyer et al. |
| 2012/0274599 A1 | 11/2012 | Schediwy et al. |
| 2012/0286944 A1 | 11/2012 | Forutanpour et al. |
| 2013/0155020 A1 | 6/2013 | Heubel et al. |
| 2014/0071079 A1 | 3/2014 | Heubel et al. |
| 2014/0159779 A1 | 6/2014 | Napoles et al. |
| 2014/0232679 A1 | 8/2014 | Whitman et al. |
| 2014/0320276 A1 | 10/2014 | Maschmeyer et al. |
| 2014/0320436 A1 | 10/2014 | Modarres et al. |
| 2015/0205368 A1 | 7/2015 | Yairi et al. |
| 2015/0205416 A1 | 7/2015 | Yairi et al. |
| 2015/0205417 A1 | 7/2015 | Yairi et al. |
| 2015/0279010 A1 | 10/2015 | Cianfrone et al. |
| 2016/0259415 A1 | 9/2016 | Steger et al. |
| 2017/0068318 A1 | 3/2017 | Kim et al. |

OTHER PUBLICATIONS

Notice of Allowance dated Jul. 13, 2017 for U.S. Appl. No. 15/284,008 of Evans V et al. filed Oct. 3, 2016.

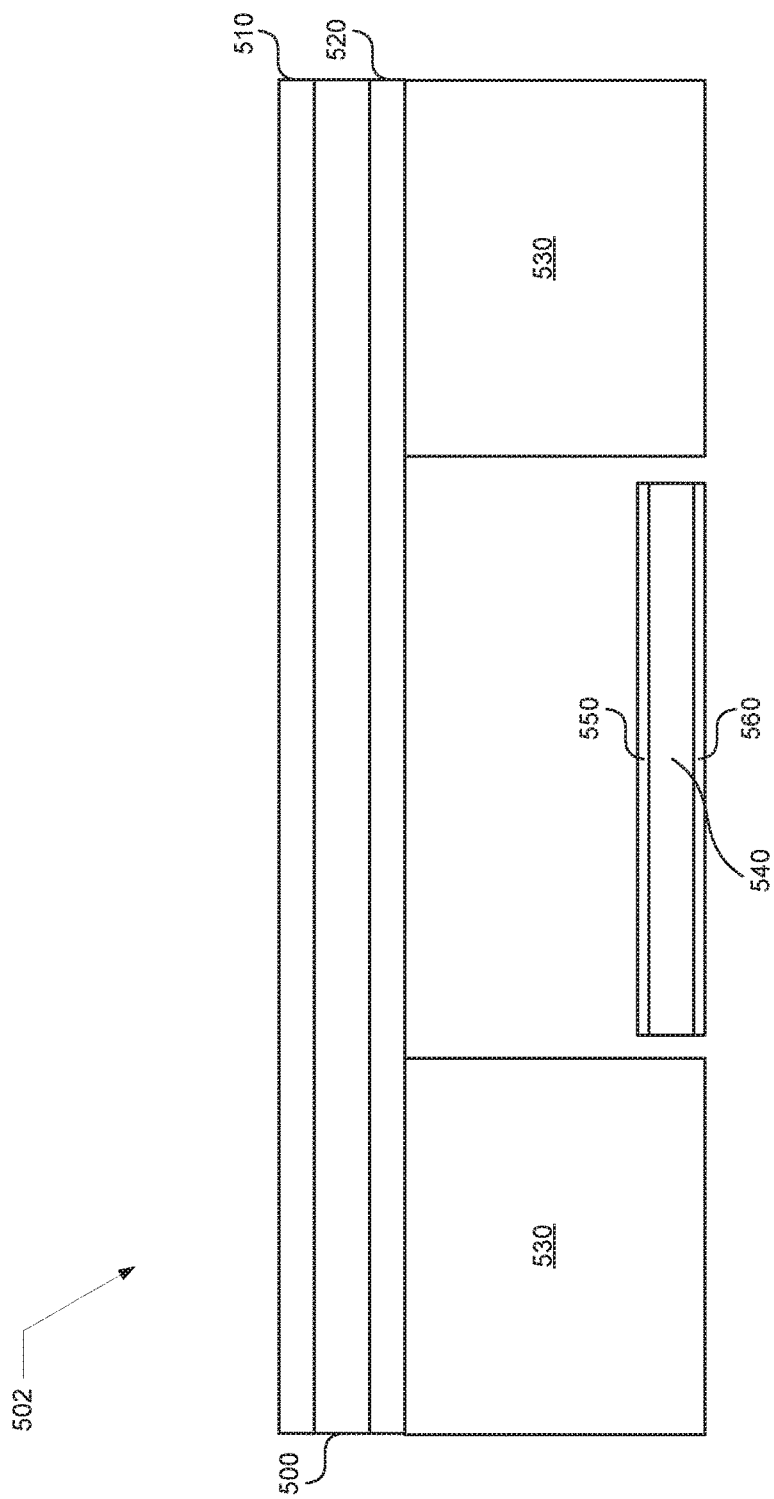

ELECTRONIC DISPLAY WITH A RELIEF

CROSS-REFERENCE TO RELATED APPLICATION

This application is a continuation of U.S. Utility patent application Ser. No. 15/284,008, filed on Oct. 3, 2016, which claims priority to U.S. Provisional Patent Application No. 62/395,243, filed on Sep. 15, 2016, which is incorporated by reference herein in its entirety.

TECHNICAL FIELD

The present application is related to electronic displays, and more specifically to methods and systems that create reliefs on electronic displays.

BACKGROUND

Current electronic displays associated with electronic devices, such as cell phones, tablets, etc., have planar screens that do not deform.

SUMMARY

Introduced here are methods and systems to create a relief on an electronic display. In one embodiment, the relief is created by micro-electromechanical systems (MEMS) placed above a cover layer of the electronic display. Each MEMS when activated can protrude or depress, thus creating the relief on the electronic display. In another embodiment, the relief is created by a plurality of resistors placed beneath the cover layer. The cover layer is made out of an elastically deformable material that, when heated, expands, thus creating a protrusion on the electronic display. Each resistor when activated heats a section of the cover layer, causing the cover layer to protrude.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

FIG. 5A shows a side view of a haptic element in an inactive state, according to one embodiment.

DETAILED DESCRIPTION

Terminology

Figure 1:
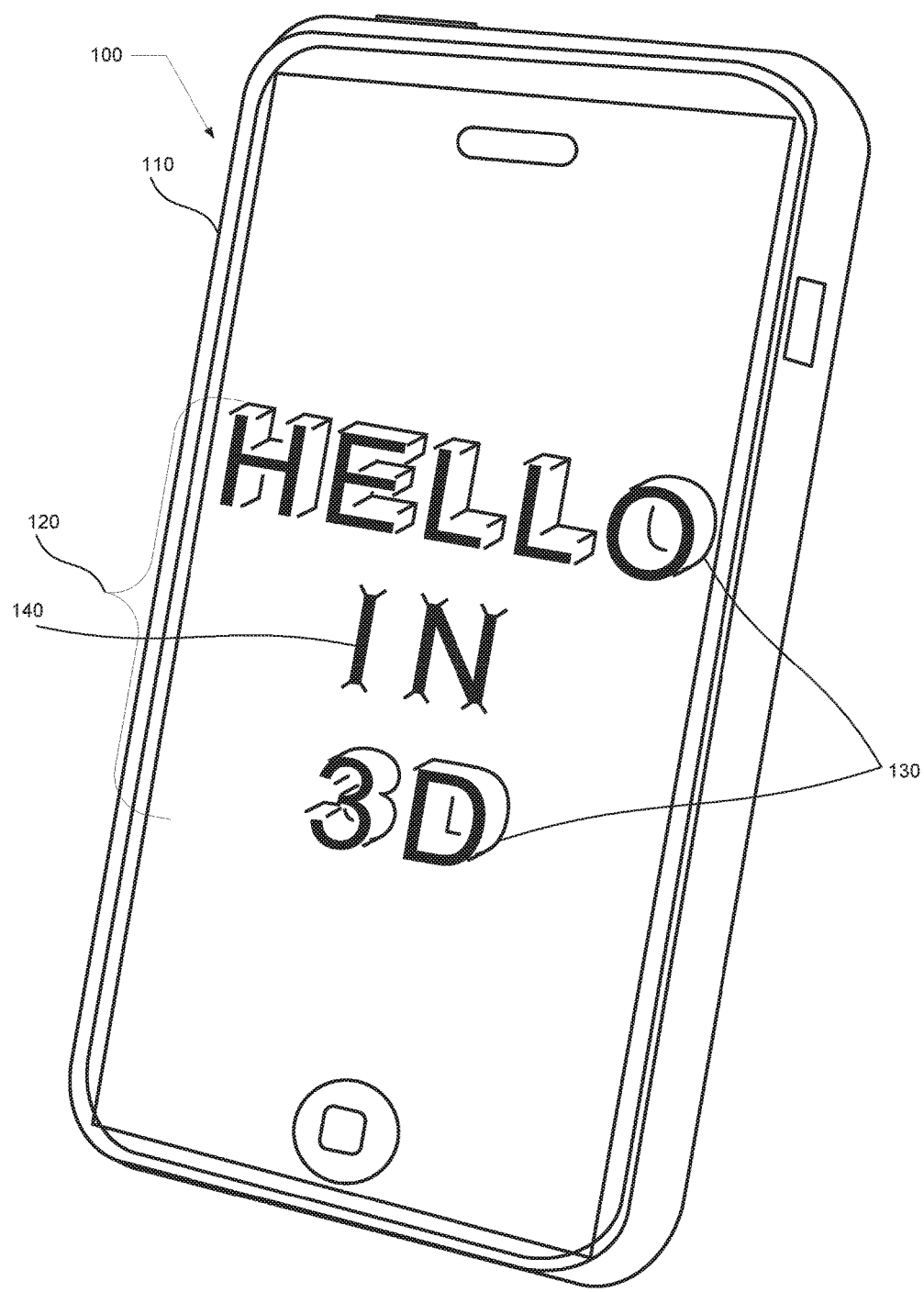
FIG. 1 shows an apparatus to create a relief associated with an electronic display, according to one embodiment.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, mean any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Technology

Introduced here are methods and systems to create a relief on an electronic display. In one embodiment, the relief is created by micro-electromechanical systems (MEMS) placed above a cover layer of the electronic display. Each MEMS when activated can protrude or depress, thus creating the relief on the electronic display. In another embodiment, the relief is created by a plurality of resistors placed beneath the cover layer. The cover layer is made out of an elastically deformable material that, when heated, expands, thus creating a protrusion on the electronic display. Each resistor when activated heats a section of the cover layer, causing the cover layer to protrude.

The relief on the electronic display can be used to form Braille text to enable visually impaired people to read text, and/or perceive images. The relief can be used to educate children about various shapes. The relief can be used for aesthetic purposes to create more engaging electronic displays.

FIG. 1 shows an apparatus to create a relief associated with an electronic display, according to one embodiment. An electronic display 100, associated with an electronic device 110, such as a mobile phone, deforms to create a relief 120, which includes protrusions 130 and/or depressions 140. The relief 120 can correspond to an image displayed on the electronic display 100, such as text, as shown in FIG. 1. Alternatively, the relief 120 can appear on the electronic display 100 without a corresponding image being displayed. The relief 120 can be formed using a haptic layer proximate to an outer surface associated with the electronic display 100.

Figure 2:
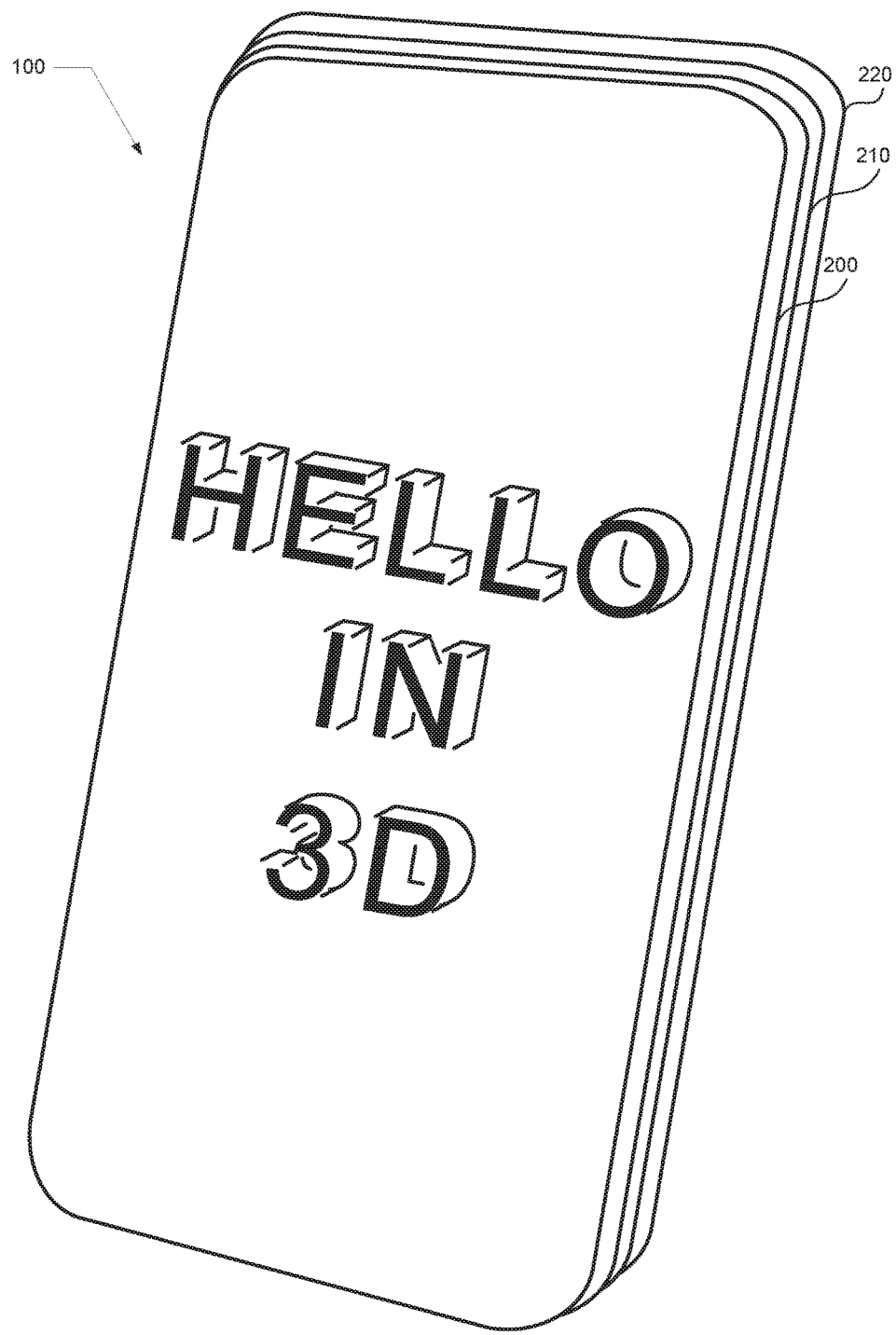
FIG. 2 shows the placement of the haptic layer with respect to a cover layer associated with the electronic display, according to one embodiment.

FIG. 2 shows the placement of the haptic layer with respect to a cover layer associated with the electronic display, according to one embodiment. Electronic display 100 includes a cover layer 200, a haptic layer 210, and a touch sensor layer 220. The cover layer 200 associated with the electronic display 100 is made out of an optically transparent material, such as glass or plastic. The haptic layer 210 can be placed between the cover layer 200 and a layer beneath the cover layer 200, such as the touch sensor layer 220. In other embodiments, the haptic layer 210 can be placed above the cover layer 200, or can be integrated into the cover layer 200. The haptic layer 210 is made out of an optically transparent material. For example, the haptic layer can be made out of a transparent piezoelectric material such as: quartz, zinc oxide, lead zirconate titanate, lithium tantalite, lithium niobate, aluminum nitride, polyvinylidenfluoride, etc.

The haptic layer 210 includes a plurality of haptic elements, such as micro-electromechanical systems (MEMS), nano-electromechanical systems (NEMS), pico-electromechanical systems (PEMS), thermal elements, and/or elastically deformable materials. The haptic elements can be made out of an optically transparent material. The thermal elements can be resistors to emit heat. Elastically deformable materials can be elastically deformable glass, elastically deformable plastic, etc.

Figure 3:
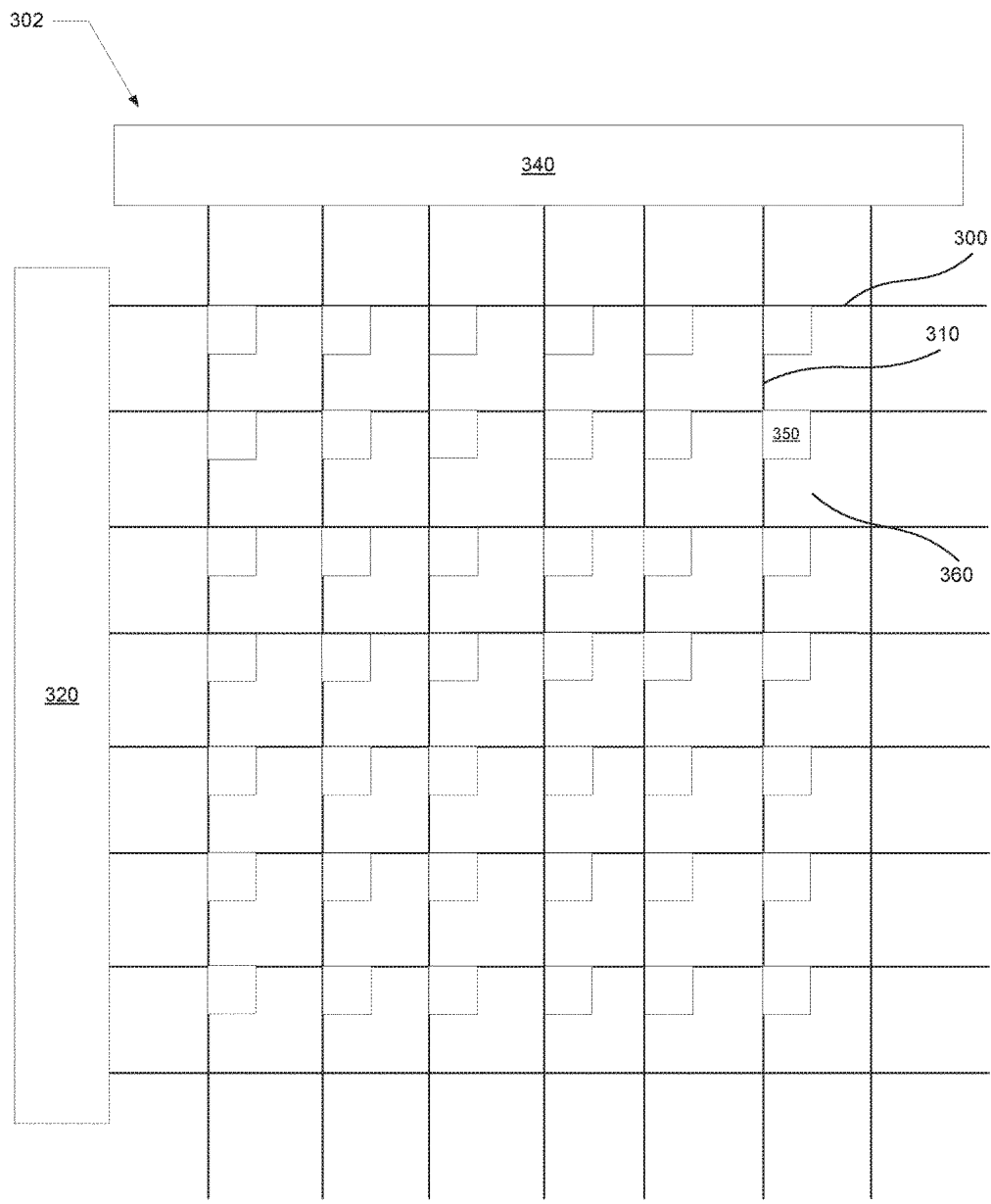
FIG. 3 shows a haptic layer, according to one embodiment.

FIG. 3 shows a haptic layer, according to one embodiment. The haptic layer 302 includes a plurality of horizontal electrodes 300 (only one labeled in FIG. 3 for brevity), a plurality of vertical electrodes 310 (only one labeled in FIG. 3 for brevity), a horizontal controller 320, a vertical controller 340, and a haptic element 350 (only one labeled in FIG. 3 for brevity). A plurality of horizontal electrodes 300 and a plurality of vertical electrodes 310 form a grid-like pattern. The plurality of horizontal electrodes 300 and the plurality of vertical electrodes 310 can be made out of optically transparent material. The resolution of the grid-like pattern can correspond to the resolution of the electronic display. For example the resolution of the grid-like pattern can be the same as the resolution of the electronic display, or can be coarser than the resolution of the electronic display. Further, the resolution of the grid-like pattern can be non-uniform. For example, the electrode grid can be denser in the center of the electronic display than at the edges of the electronic display.

The horizontal controller 320 connected to the horizontal electrodes 300 activates at least one horizontal electrode at a time. The vertical controller 340 connected to the vertical electrodes 310 activates at least one vertical electrode at a time. The horizontal controller 320 and the vertical controller 340 are connected to a processor. The processor is configured to send an instruction to the horizontal controller 320 and the vertical controller 340. The instruction includes an identification (ID) associated with a horizontal electrode or a vertical electrode. The instruction can also include an instruction to protrude or to depress.

The haptic element 350 is connected to at least one horizontal and at least one vertical electrode. When both the horizontal and the vertical electrodes are activated, the haptic element 350 is also activated. The haptic element 350 can be disposed anywhere within a region 360 formed by the plurality of horizontal electrodes 300 and the plurality of vertical electrodes 310, such as: the upper left corner of the region 360 as shown in FIG. 3, center of the region 360, any of the remaining corners of the region 360, or anywhere within the region 360.

The haptic element 350 can be a device such as MEMS, NEMS, or PEMS attached to the cover layer. When activated, the device can protrude or can depress. The region of the cover layer attached to the device follows the shape of the device, and protrudes or depresses in response to the force exerted by the device against the cover layer.

The haptic element 350 can be a thermal element made out of a heat dissipating material. When activated, the thermal element dissipates heat, warming the cover layer, and causing the cover layer to protrude in the region where the cover layer is heated.

The haptic element 350 can include both the device, such as MEMS, NEMS, or PEMS, and the thermal element. The device and the thermal element can be joined, or can be placed apart, anywhere within the region 360 (only one region labeled for brevity in FIG. 3). The device and the thermal element are connected to the same set of horizontal and vertical electrodes, and are both activated at the same time. When activated, the thermal element heats the cover layer, thus making the cover layer more malleable. At the same time the activated device exerts a force on the cover layer causing the cover layer to protrude or depress in the region 360.

Figure 4A:
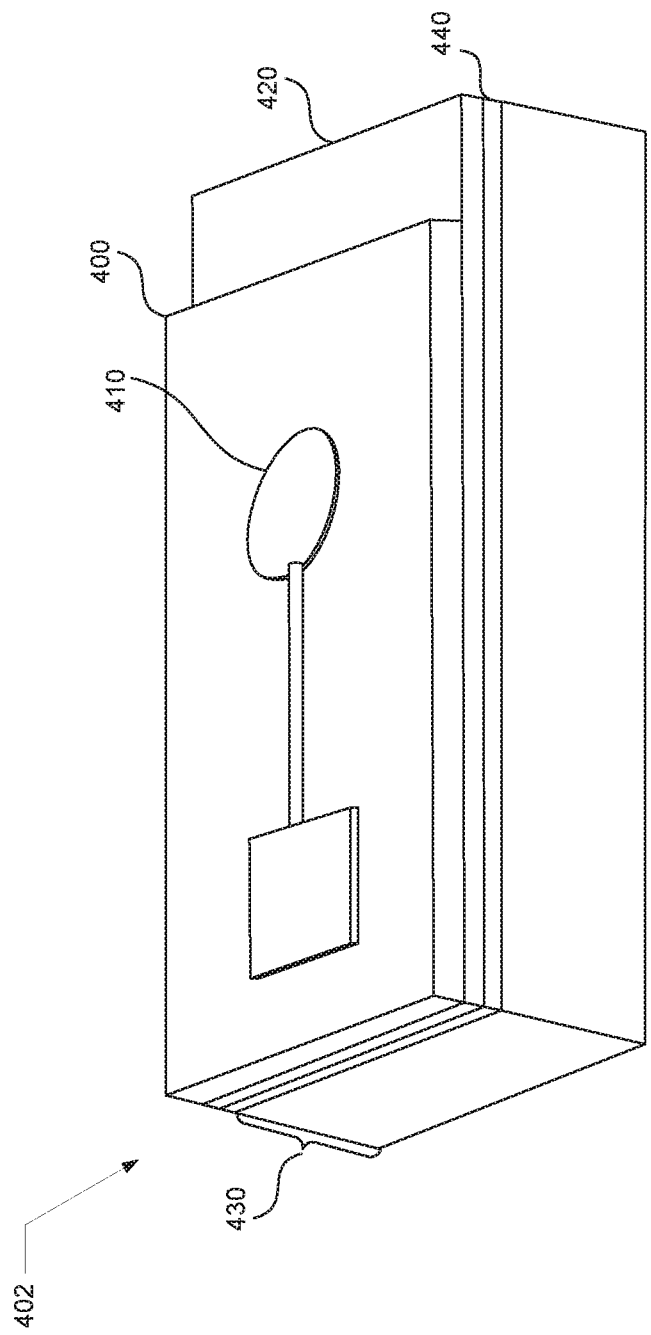
FIG. 4A shows a three-quarters view of a haptic element, according to one embodiment.

FIG. 4A shows a three-quarters view of a haptic element, according to one embodiment. The haptic element 402 includes a thin membrane 400, electrodes 410, 420, one or more non-deforming anchors 430, and optionally one or more additional elastic layers 440. The thin membrane 400 is placed between electrodes 410, 420. The thin membrane 400 can be made out of various transparent piezoelectric materials such as: quartz, zinc oxide, lead zirconate titanate, lithium tantalite, lithium niobate, aluminum nitride, polyvinylidenfluoride, etc. The thin membrane 400 is constrained by one or more non-deforming anchors 430. The one or more non-deforming anchors 430 prevents the thin membrane 400 from moving at the points of contact with the one or more non-deforming anchors 430, while leaving the rest of the thin membrane 400 to deform. One or more additional elastic layers 440 can be placed beneath the piezoelectric material of the thin membrane 400 for protection.

Figure 4D:
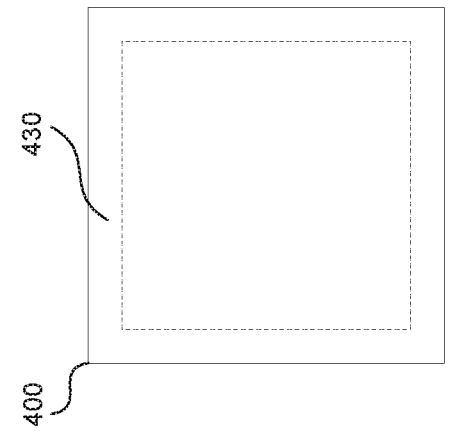
FIGS. 4B-4D show a placement of the one or more non-deforming anchors 430, according to various embodiments.
Figure 4C:
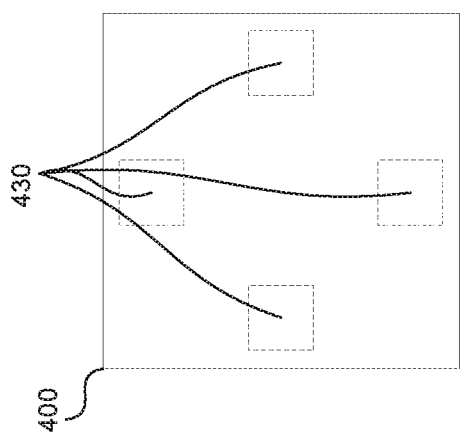
Figure 4B:
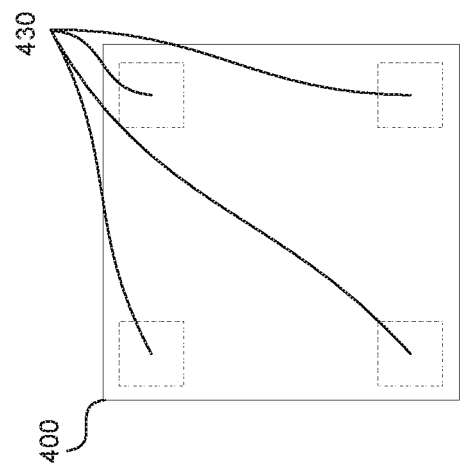

FIGS. 4B-4D show a placement of the one or more non-deforming anchors 430, according to various embodiments. The one or more non-deforming anchors 430 are placed to allow a center of the thin membrane 400 to deform freely. The one or more non-deforming anchors 430 can be placed at the corners of the thin membrane 400 as shown in FIG. 4B, along the sides of the thin membrane 400 as shown in FIG. 4C, continuously along the perimeter of the thin membrane 400 as shown in FIG. 4D, etc.

Figure 4E:
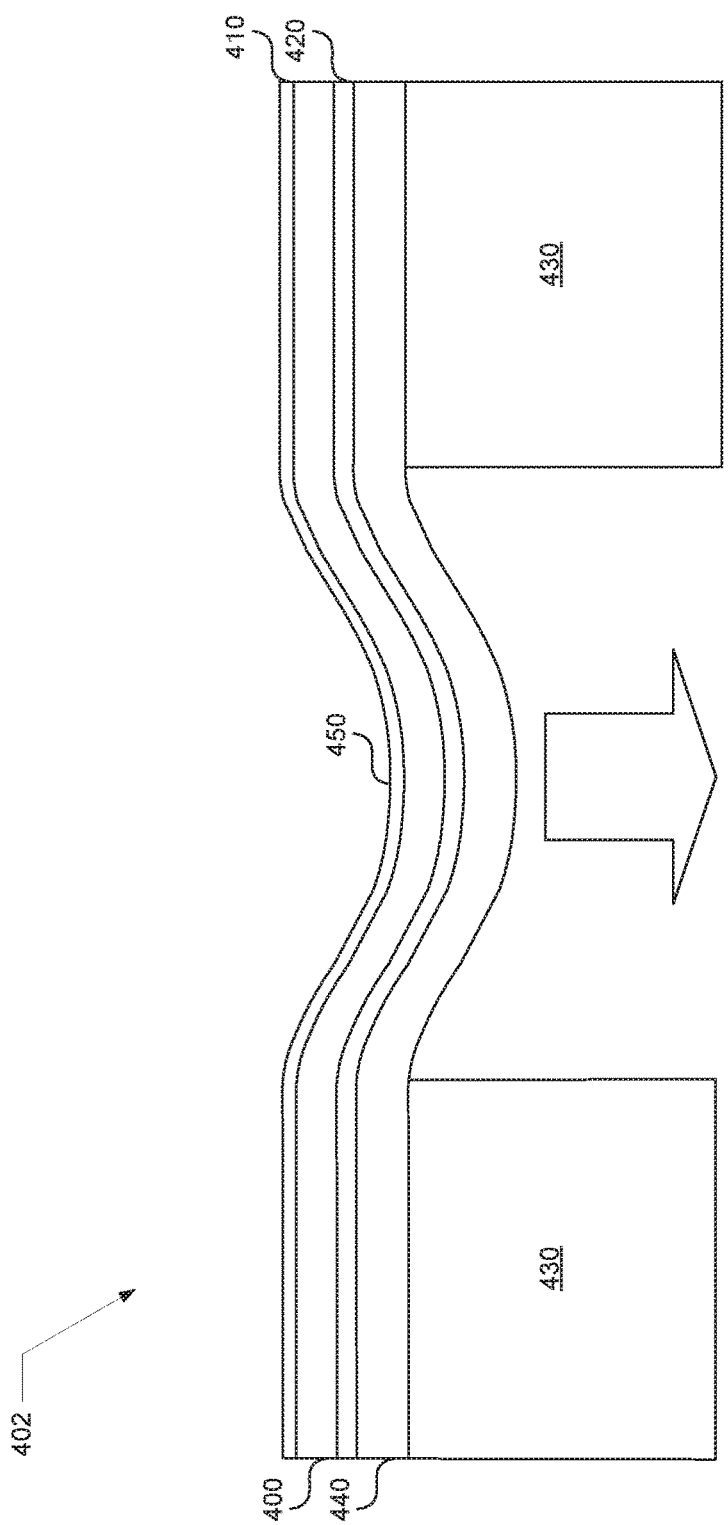
FIG. 4E shows a side view of a haptic element in an activated state, according to one embodiment.

FIG. 4E shows a side view of the haptic element 402 in an activated state, according to one embodiment. When the electrodes 410, 420 are activated, a voltage is applied to the thin membrane 400. As a result, the thin membrane 400 deforms inward, in the region not supported by the one or more non-deforming anchors 430. The optional elastic layer 440 deforms along with the thin membrane 400. Thus the haptic device creates a depression 450 at the top surface of the thin membrane 400.

FIG. 5A shows a side view of a haptic element in an inactive state, according to one embodiment. The haptic element 502 includes a thin membrane 500, electrodes 510, 520 applying voltage to the thin membrane 500, one or more non-deforming anchors 530, a capacitor 540, and electrodes 550, 560 applying voltage to the capacitor 540. The thin membrane 500 in a rest state does not have any protrusions. One or more anchors 530 in contact with the thin membrane 500 support the thin membrane 500, and prevent the thin membrane 500 from deforming at the points of contact with the one or more anchors 530. Electrodes 510, 520 apply voltage to the thin membrane 500. For example, the electrode 510 can apply positive voltage, while the electrode 520 can apply negative voltage.

The capacitor 540, co-centric with the thin membrane 500, is placed beneath the thin membrane 500 and between the one or more anchors 530. The capacitor is connected to electrodes 550, 560. Electrodes 550, 560 apply voltage to the capacitor 540, charging the top surface of the capacitor 540, facing the thin membrane 500, either positively or negatively.

Figure 5B:
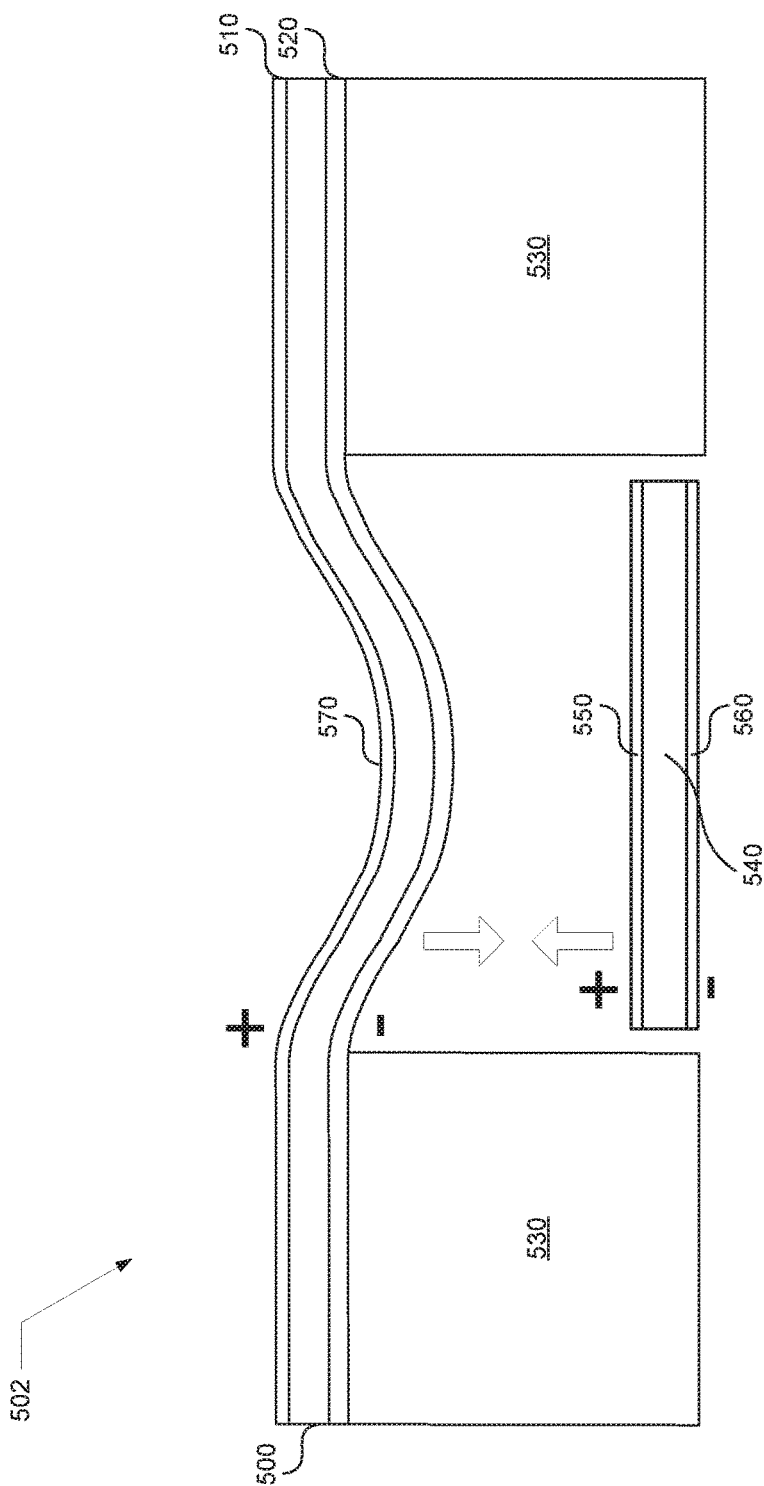
FIG. 5B shows a side view of the haptic element in an active state, according to one embodiment.

FIG. 5B shows a side view of the haptic element 502 in an active state, according to one embodiment. For example, when the electrodes 510, 520 are active, they charge the thin membrane 500 so that the top surface of the thin membrane is positively charged, and that the bottom surface of the thin membrane is negatively charged. At the same time the electrodes 550, 560 apply voltage to the capacitor 540 so that the top surface of the capacitor 540 is positively charged, and the bottom surface is negatively charged. The negatively charged bottom surface of the thin membrane 500 is attracted to the positively charged top surface of the capacitor 540. As a result, the thin membrane 500 deforms inward, creating a depression 570 on the top surface of the thin membrane 500.

Figure 5C:
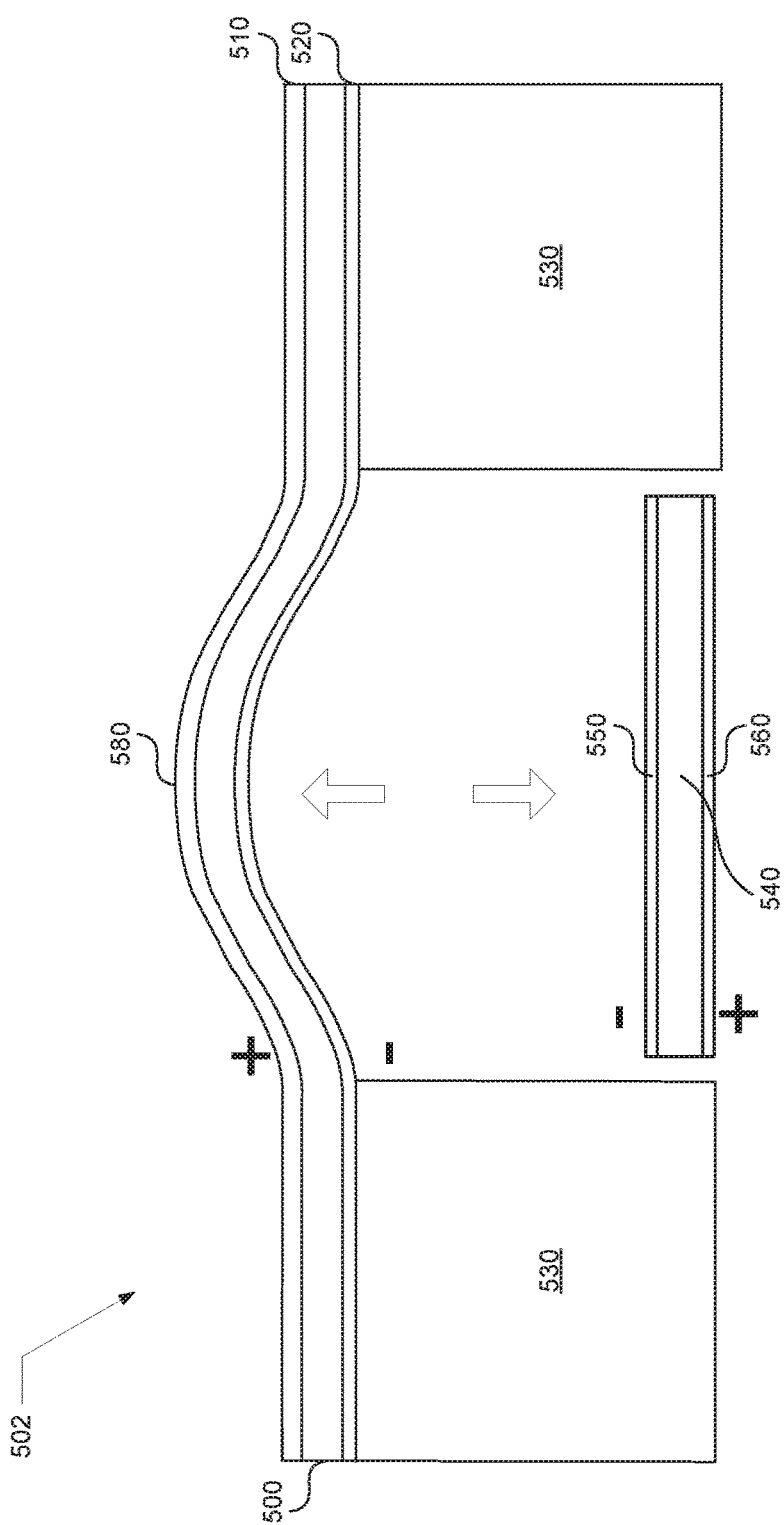
FIG. 5C shows a side view of the haptic element in an active state, according to another embodiment.

FIG. 5C shows a side view of the haptic element 502 in an active state, according to another embodiment. For example, when the electrodes 510, 520 are active, they charge the thin membrane 500 so that the top surface of the thin membrane is positively charged, and that the bottom surface of the thin membrane is negatively charged. At the same time the electrodes 550, 560 apply voltage to the capacitor 540 so that the top surface of the capacitor 540 is negatively charged, and the bottom surface is positively charged. The negatively charged bottom surface of the thin membrane 500 is repelled from the negatively charged top surface of the capacitor 540. As a result, the thin membrane 500 deforms inward, creating a protrusion 580 at the top surface of the thin membrane 500.

Figure 5D:
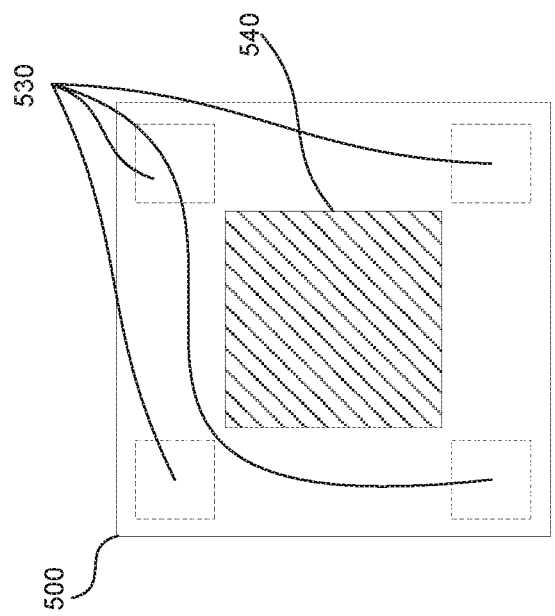
FIG. 5D shows a top view of a haptic element, according to one embodiment.

FIG. 5D shows a top view of a haptic element, according to one embodiment. The haptic element is a thin membrane 500, supported by one or more anchors 530 at each corner of the thin membrane 500. The one or more anchors 530 prevent the thin membrane 500 from deforming at the support points. The one or more anchors 530 can be placed at the corners of the thin membrane 500, as shown in FIG. 5D, at the sides of the thin membrane 500, continuously along the perimeter of the thin membrane 500, etc. The capacitor 540 is co-centric with the thin membrane 500, and placed beneath the thin membrane 500.

Figure 6A:
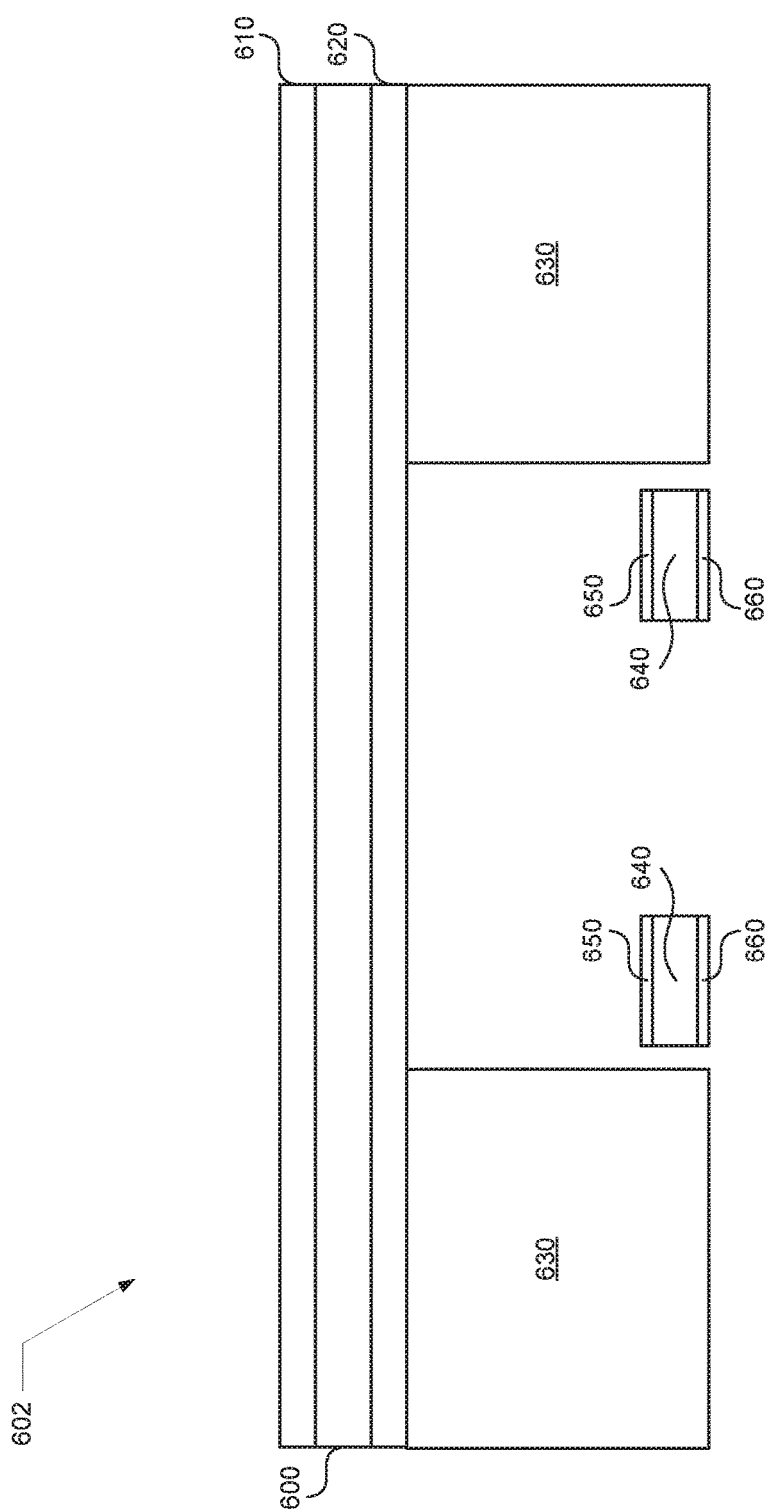
FIG. 6A shows a side view of a haptic element in an inactive state, according to an embodiment.

FIG. 6A shows a side view of a haptic element in an inactive state, according to an embodiment. The haptic element 602 includes a thin membrane 600, electrodes 610, 620 applying voltage to the thin membrane 600, one or more non-deforming anchors 630, one or more capacitors 640, and electrodes 650, 660 applying voltage to the capacitor 640. The thin membrane 600 in an inactive state does not have any protrusions. One or more anchors 630 in contact with the thin membrane 600 support the thin membrane 600, and prevent the thin membrane 600 from deforming at the points of contact with the one or more anchors 630. Electrodes 610, 620 apply voltage to the thin membrane 600. For example, the electrode 610 can apply positive voltage, while the electrode 620 can apply negative voltage.

One or more capacitors 640 are placed beneath the thin membrane 600 and between the one or more anchors 630. The one or more capacitors 640 are connected to two or more electrodes 650, 660. Two or more electrodes 650, 660 apply voltage to the one or more capacitors 640, charging the top surfaces of the one or more capacitors 640, facing the thin membrane 600, either positively or negatively. The one or more capacitors 640 are shaped and/or placed away from the center of the thin membrane 600, so that when the thin membrane 600 depresses, as shown in FIG. 6B, the thin membrane 600 does not come into contact with the one or more capacitors 640.

Figure 6B:
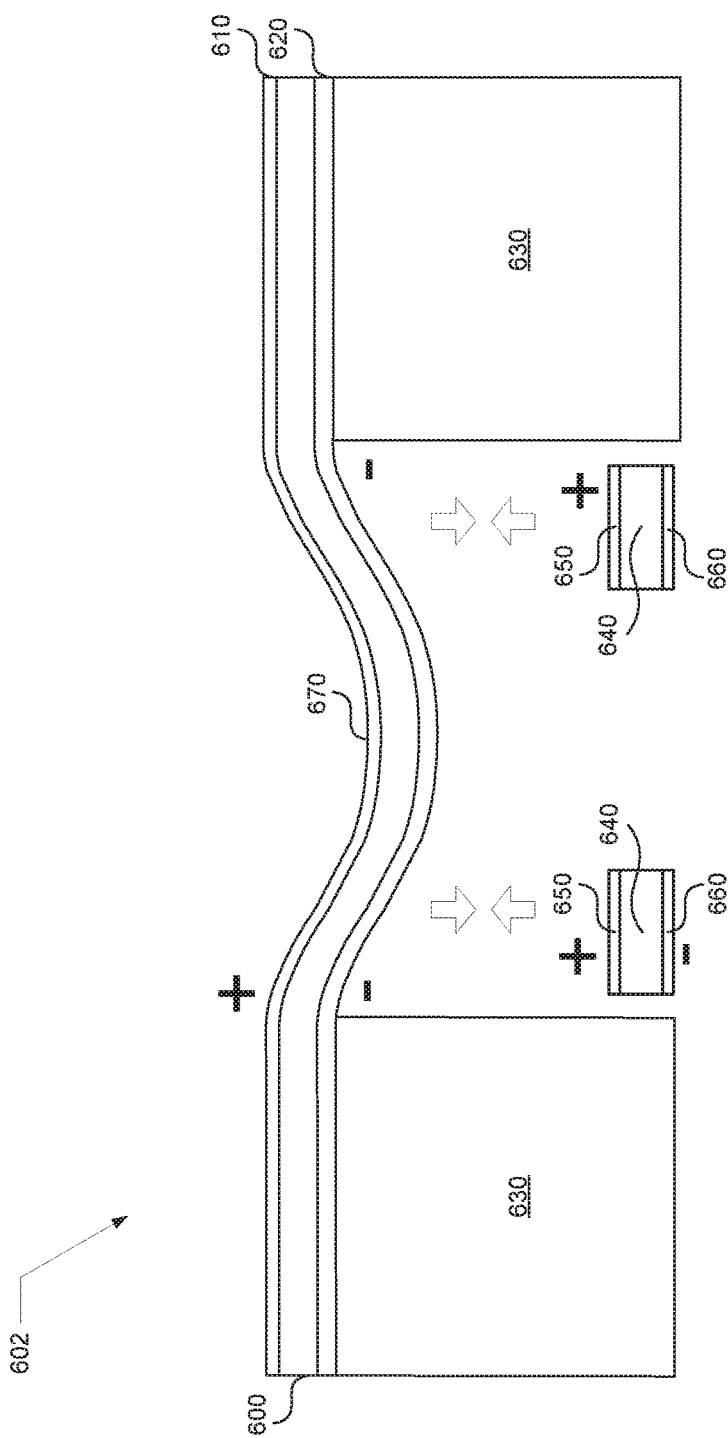
FIG. 6B shows a side view of the haptic element in an active state, according to one embodiment.

FIG. 6B shows a side view of the haptic element 602 in an active state, according to one embodiment. For example, when the electrodes 610, 620 are active, they charge the thin membrane 600 so that the top surface of the thin membrane is positively charged, and that the bottom surface of the thin membrane is negatively charged. At the same time the electrodes 650, 660 apply voltage to the one or more capacitors 640 so that the top surface of the one or more capacitors 640 is positively charged, and the bottom surface is negatively charged. The negatively charged bottom surface of the thin membrane 500 is attracted to the positively charged top surface of the one or more capacitors 640. As a result, the thin membrane 600 deforms inward, creating a depression 670 at the top surface of the thin membrane 600.

Figure 6C:
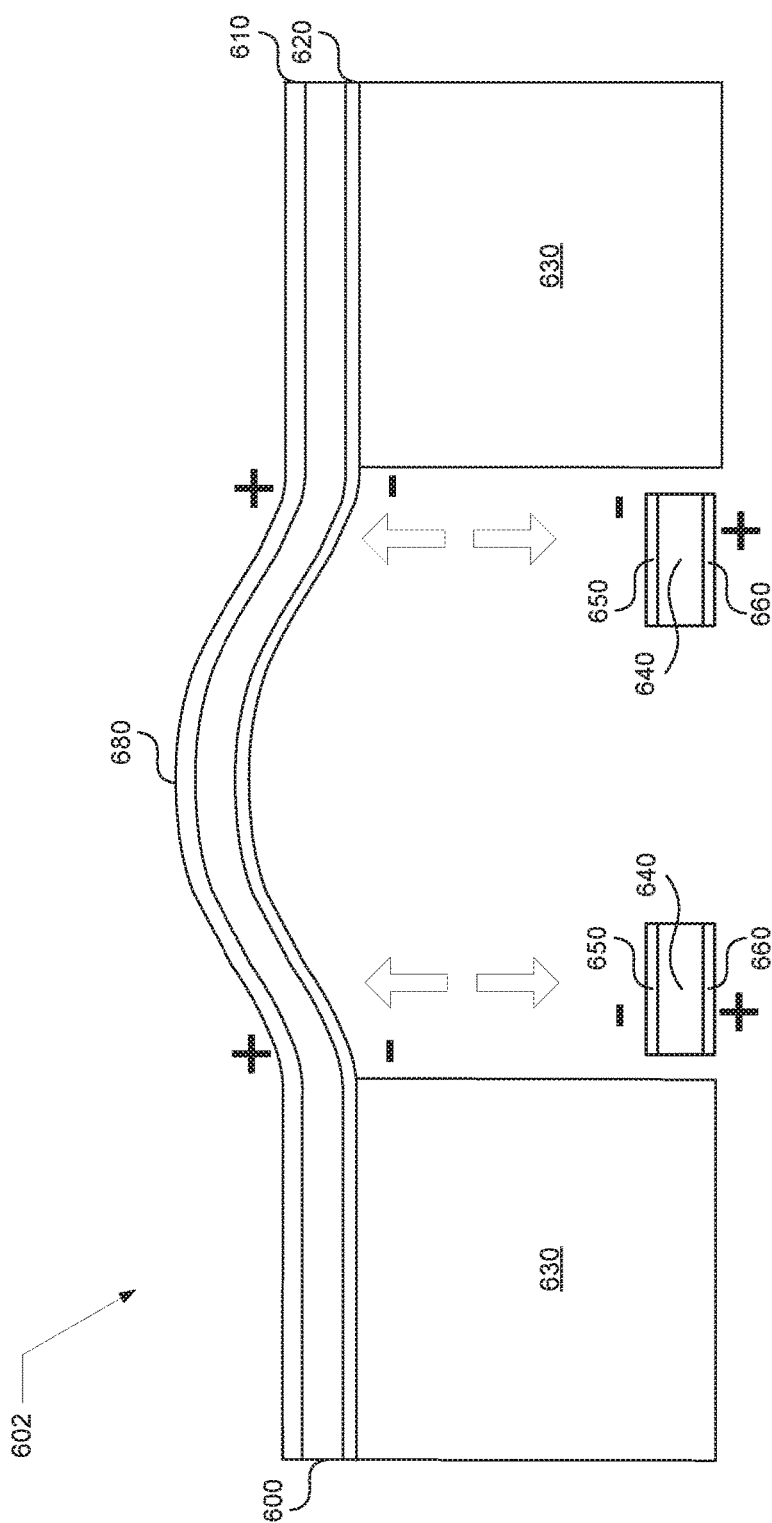
FIG. 6C shows a side view of the haptic element in an active state, according to another embodiment.

FIG. 6C shows a side view of the haptic element 602 in an active state, according to another embodiment. For example, when the electrodes 610, 620 are active, they charge the thin membrane 600 so that the top surface of the thin membrane is positively charged, and that the bottom surface of the thin membrane is negatively charged. At the same time the electrodes 650, 660 apply voltage to the one or more capacitors 640 so that the top surface of the one or more capacitors 640 is negatively charged, and the bottom surface is positively charged. The negatively charged bottom surface of the thin membrane 600 is repelled from the negatively charged top surface of the one or more capacitors 640. As a result, the thin membrane 600 deforms inward, creating a protrusion 680 at the top surface of the thin membrane 600.

Figure 6E:
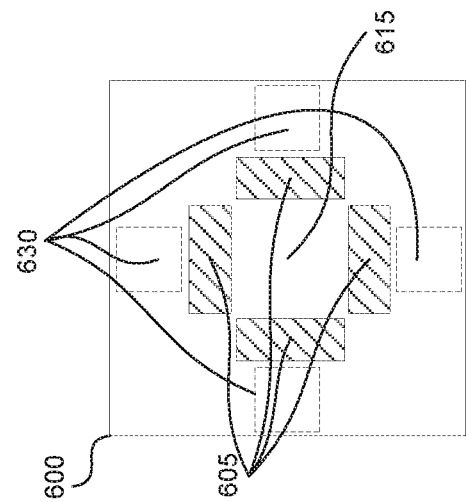
FIG. 6D-6E show a top view of a haptic element, according to various embodiments.
Figure 6D:
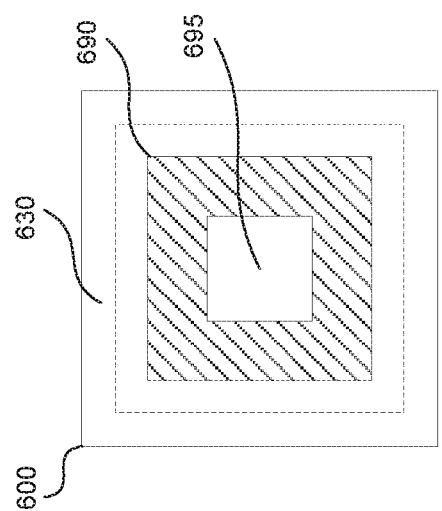

FIG. 6D-6E show a top view of a haptic element, according to various embodiments. The haptic element is a thin membrane 600, supported by one or more anchors 630 at each corner of the thin membrane 600. The one or more anchors 630 prevent the thin membrane 600 from deforming at the support points. The one or more anchors 630 can be placed continuously along the perimeter of the thin membrane 600, as shown in FIG. 6D, at the sides of the thin membrane 600 as shown in FIG. 6E, at the corners of the thin membrane 600, etc.

In FIG. 6D, a single capacitor 690 is co-centric with the thin membrane 600, and placed beneath the thin membrane 600. A center region 695 of the single capacitor 690 is removed to prevent a depressed thin membrane 600 as shown in FIG. 6B from coming in contact with the single capacitor 690. The center region 695 can take on various shapes such as a square as shown in FIG. 6B, a rectangle, a circle, an ellipse, etc. The single capacitor 690 can also take on various shapes such as a square as shown in FIG. 6B, a rectangle as shown, a circle, an ellipse, etc. The single capacitor 690 and the center region 695, can, but do not have to take on the same shape. As a result, when the thin membrane 600 depresses as shown in FIG. 6B, the thin membrane 600 does not come into contact with the single capacitor 690.

In FIG. 6E, a plurality of capacitors 605 are placed beneath the thin membrane 600, and away from the center of the thin membrane 600. The plurality of capacitors 605 can take on various shapes such as a square, a rectangle, a curved shape, etc. The plurality of capacitors 605 can take on the same shape, or can have various shapes. The plurality of capacitors 605 are arranged so that they form an empty central region 615, without any capacitors. The empty central region 615 is placed beneath the center of the thin membrane 600. As a result, when the thin membrane 600 depresses as shown in FIG. 6B, the thin membrane 600 does not come into contact with the plurality of capacitors 605.

Figure 7:
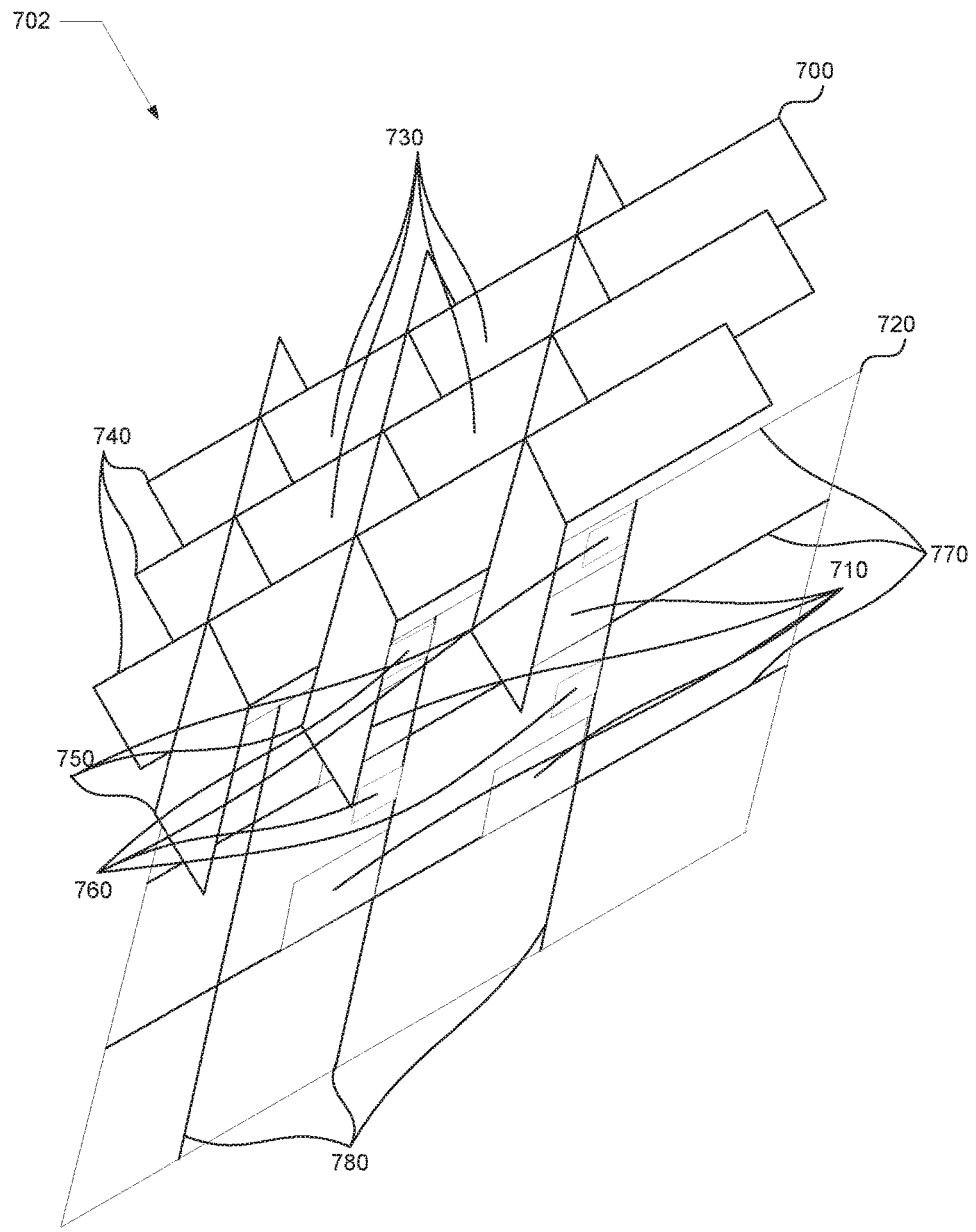
FIG. 7 shows a haptic layer, according to another embodiment.

FIG. 7 shows a haptic layer, according to another embodiment. The haptic layer 702 includes a cover layer 700, a thermal layer 710, an electrode layer 720, and an optional device layer 760. The cover layer 700 defines the outer surface associated with the electronic display. The cover layer 700 includes a plurality of substantially thermally insulated cells 730 defined by a grid of thermally insulating material. The grid of thermally insulating material includes a plurality of horizontal thermal barriers 740 and a plurality of vertical thermal barriers 750. Each cell in the plurality of substantially thermally insulated cells 730 contains an elastically deformable material configured to protrude in response to heat, such as elastically deformable glass, or elastically deformable plastic. The elastically deformable material is optically transparent.

The thermal layer 710 includes a plurality of thermal elements corresponding to the plurality of substantially thermally insulated cells 730. When activated, each thermal element in the plurality of thermal elements heats the corresponding thermally insulated cell. The thermal element can be made out of a thermally dissipating material. For example, the thermal element can be a resistor.

The optional device layer 760 includes a plurality of devices corresponding to the plurality of substantially thermally insulated cells 730. A device in the plurality of devices can be a device configured to protrude or depress, such as a MEMS, a NEMS, or a PEMS. The device and the thermal element can be joined or can be placed apart anywhere within the cell as shown in FIG. 7. The device and the thermal element are connected to the same set of horizontal and vertical electrodes, and are both activated at the same time. When activated, the thermal element heats the cover layer, thus making the cover layer more malleable. At the same time, the activated device exerts a force on the cover layer causing the cover layer to protrude or depress.

The electrode layer 720 includes a plurality of horizontal electrodes 770 and a plurality of vertical electrodes 780. The plurality of horizontal electrodes 770 corresponds to the plurality of horizontal thermal barriers 740, while the plurality of vertical electrodes 780 corresponds to the plurality of vertical thermal barriers 750. At least one horizontal electrode and at least one vertical electrode when activated cause one thermal element to activate. In turn, the thermal element heats the corresponding cell in the plurality of substantially thermally insulated cells 730, causing the elastically deformable material to protrude.

A horizontal controller (not pictured) connected to the plurality of horizontal electrodes 770 activates at least one horizontal electrode at a time. A vertical controller (not pictured) connected to the vertical electrodes 780 activates at least one vertical electrode at a time. The horizontal controller and the vertical controller are connected to a processor. The processor is configured to send an instruction to the horizontal controller and the vertical controller. The instruction includes an ID associated with a horizontal electrode or a vertical electrode.

Various methods can be implemented to manufacture and operate the system as described herein. For example, a method to create a relief associated with an electronic display includes providing a haptic layer disposed proximate to an outer surface associated with the electronic display, the haptic layer comprising a plurality of micro-electromechanical systems (MEMS) to create the relief associated with the electronic display, the relief comprising at least one of a depression or a protrusion on the electronic display, said providing the haptic layer including: providing a thin piezoelectric membrane configured to bend when a voltage is applied to the thin piezoelectric membrane; providing an anchor to support the thin piezoelectric membrane, and the anchor to prevent the thin piezoelectric membrane from bending at points of contact; providing a plurality of membrane electrodes proximate to the thin piezoelectric membrane, the plurality of membrane electrodes to apply the voltage to the thin piezoelectric membrane. Finally, the method to create the relief includes providing a controller coupled to the haptic layer, the controller to activate at least one MEMS in the plurality of MEMS associated with the haptic layer.

Providing the haptic layer includes: providing a capacitor placed beneath the thin piezoelectric membrane, a top surface of the capacitor facing a bottom surface of the thin piezoelectric membrane; providing a plurality of capacitor electrodes proximate to the capacitor, the plurality of capacitor electrodes to create an electric charge on the top surface of the capacitor, the electric charge comprising one of a positive charge or a negative charge; providing the plurality of membrane electrodes proximate to the thin piezoelectric membrane, the plurality of membrane electrodes to create the electric charge on the bottom surface of the thin piezoelectric membrane; and providing the thin piezoelectric membrane to protrude when the electric charge on the bottom surface of the thin piezoelectric membrane matches the electric charge on the top surface of the capacitor, and the thin piezoelectric membrane to depress when the electric charge on the bottom surface of the thin piezoelectric membrane is opposite of the electric charge on the top surface of the capacitor.

The method to create the relief associated with the electronic display includes providing a cover layer defining the outer surface associated with the electronic display, the cover layer to create at least one of the depression or the protrusion when activated; providing a touch sensor layer disposed beneath the cover layer; and providing the haptic layer disposed between the cover layer and the touch sensor layer, the haptic layer to exert pressure on the cover layer to cause the cover layer to create at least one of the depression or the protrusion.

The method to create the relief associated with the electronic display further includes sending, by a processor to the haptic layer, an instruction to the controller to activate at least one MEMS in the plurality of MEMS, the instruction comprising an ID associated with at least two electrodes.
Computer FIG. 8 is a diagrammatic representation of a machine in the example form of a computer system 800 within which a set of instructions, for causing the machine to perform any one or more of the methodologies or modules discussed herein, may be executed.

Figure 8:
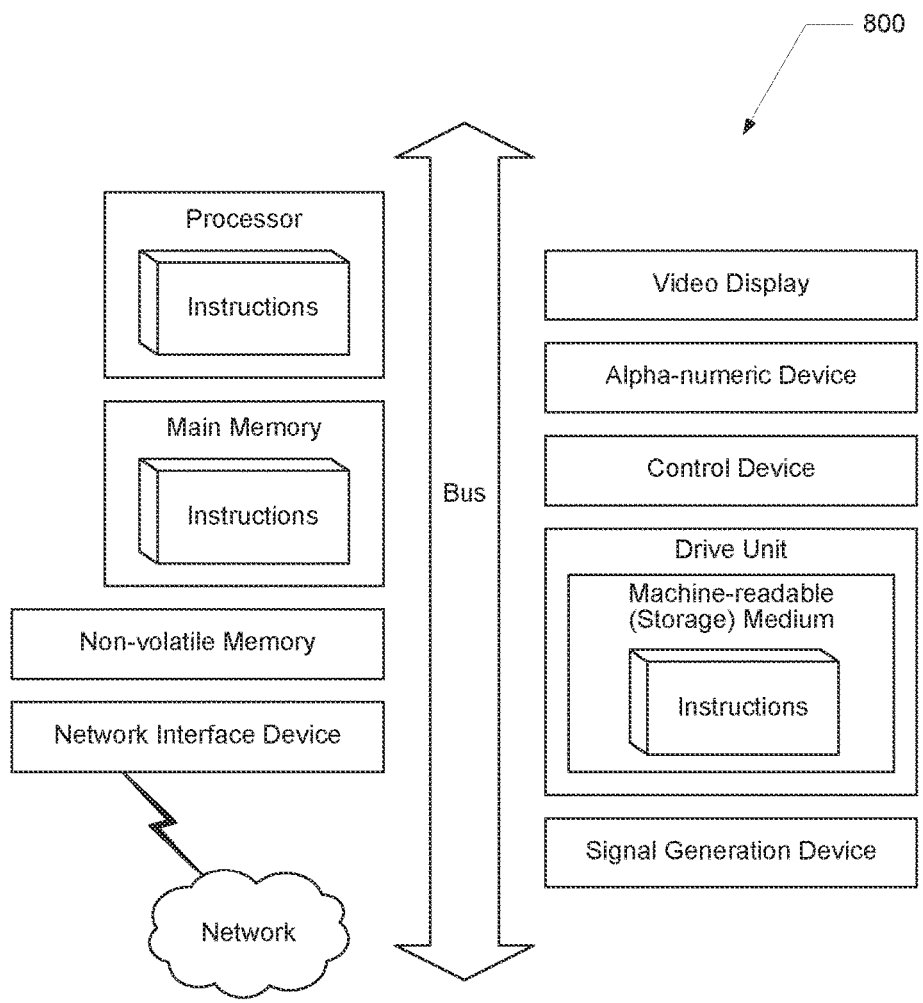
FIG. 8 is a diagrammatic representation of a machine in the example form of a computer system within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software and local cache that, ideally, serve to speed up execution. As used herein, a software program is assumed to be stored at any known or convenient location (from non-volatile storage to hardware registers)

when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that causes the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus to create a relief associated with an electronic display, the apparatus comprising:
    a haptic layer disposed proximate to an outer surface associated with the electronic display, the haptic layer comprising a plurality of micro-electromechanical systems (MEMS) to create the relief associated with the electronic display, the relief comprising at least one of a depression or a protrusion on the electronic display, a MEMS in the plurality of MEMS comprising:
        a thin piezoelectric membrane configured to bend when a voltage is applied to the thin piezoelectric membrane;
        an anchor to support the thin piezoelectric membrane at a proximal end of the anchor, and the anchor to prevent the thin piezoelectric membrane from bending at points of contact;
        two electrodes in contact with the thin piezoelectric membrane to apply the voltage to the thin piezoelectric membrane without a third electrode disposed at a distal end of the anchor; and
    a controller coupled to the haptic layer, the controller to activate at least one MEMS in the plurality of MEMS associated with the haptic layer.

2. The apparatus of claim 1, the haptic layer comprising a plurality of electrodes corresponding to the plurality of MEMS, wherein activating at least two electrodes in the plurality of electrodes causes the corresponding one or more MEMS to create at least one of the depression or the protrusion.

3. The apparatus of claim 2, a resolution associated with the plurality of electrodes corresponding to a resolution associated with the electronic display.

4. The apparatus of claim 1, wherein the haptic layer comprises an optically transparent material.

5. The apparatus of claim 1, comprising:
    a cover layer defining the outer surface associated with the electronic display, the cover layer to create at least one of the depression or the protrusion when activated;
    a touch sensor layer disposed beneath the cover layer; and
    the haptic layer disposed between the cover layer and the touch sensor layer, the haptic layer to exert pressure on the cover layer to cause the cover layer to create at least one of the depression or the protrusion.

6. The apparatus of claim 1, wherein the haptic layer defines the outer surface associated with the electronic display.

7. The apparatus of claim 1, further comprising:
    a processor coupled to the haptic layer, the processor configured to send an instruction to the controller to activate at least one MEMS in the plurality of MEMS, the instruction comprising an ID associated with at least two electrodes.

8. The apparatus of claim 7, wherein the instruction further comprises the instruction to protrude, or the instruction to depress.

9. An apparatus to create a relief associated with an electronic display, the apparatus comprising:
    a haptic layer disposed proximate to an outer surface associated with the electronic display, the haptic layer comprising a plurality of haptic elements to create the relief associated with the electronic display, the relief comprising a depression or a protrusion on the electronic display, a haptic element in the plurality of haptic elements comprising:
        a thin piezoelectric membrane configured to bend when a voltage is applied to the thin piezoelectric membrane;
        an anchor to support the thin piezoelectric membrane at a proximal end of the anchor, and the anchor to prevent the thin piezoelectric membrane from bending at points of contact;
        two electrodes in contact with the thin piezoelectric membrane to apply the voltage to the thin piezoelectric membrane without a third electrode disposed at a distal end of the anchor; and
    a controller coupled to the haptic layer, the controller to activate at least one haptic element in the plurality of haptic elements associated with the haptic layer.

10. The apparatus of claim 9, the haptic layer comprising a plurality of electrodes corresponding to the plurality of haptic elements, wherein activating at least two electrodes in the plurality of electrodes causes the corresponding one or more haptic elements to create at least one of the depression or the protrusion, wherein the plurality of electrodes are communicatively coupled to the controller.

11. The apparatus of claim 9, wherein the haptic layer comprises an optically transparent material.

12. The apparatus of claim 9, wherein the haptic layer comprises:
    a cover layer defining the outer surface associated with the electronic display, the cover layer comprising an elastically deformable material, the elastically deformable material to create the relief when activated.

13. The apparatus of claim 9, wherein the haptic layer comprises:
    a cover layer defining the outer surface associated with the electronic display, the cover layer comprising a plurality of substantially thermally insulated cells, each cell in the plurality of substantially thermally insulated cells comprising an elastically deformable material, the elastically deformable material to protrude in response to heat;
    a thermal layer comprising a plurality of thermal elements, the plurality of thermal elements corresponding to the plurality of substantially thermally insulated cells, each thermal element in the plurality of thermal elements configured, when activated, to heat the corresponding thermally insulated cell; and
    an electrode layer comprising a plurality of electrodes corresponding to the plurality of thermal elements, the plurality of electrodes to activate a thermal element in the plurality of thermal elements.

14. The apparatus of claim 9, wherein the haptic layer comprises:
    a device layer comprising a plurality of devices, each device in the plurality of devices configured, when activated, to protrude, or to depress;
    a cover layer defining the outer surface associated with the electronic display, the cover layer coupled to the device layer, the cover layer to deform in response to the plurality of devices creating the relief; and
    an electrode layer comprising a plurality of electrodes corresponding to the plurality of devices, the plurality of electrodes to activate a device in the plurality of devices.

15. The apparatus of claim 9, wherein the haptic layer comprises:
    a cover layer defining the outer surface associated with the electronic display, the cover layer comprising a plurality of substantially thermally insulated cells, each cell in the plurality of substantially thermally insulated cells comprising an elastically deformable material, the elastically deformable material to protrude in response to heat;
    a thermal layer comprising a plurality of thermal elements, the plurality of thermal elements corresponding to the plurality of substantially thermally insulated cells, each thermal element in the plurality of thermal elements configured, when activated, to heat the corresponding thermally insulated cell;
    a device layer comprising a plurality of devices, the plurality of devices corresponding to the plurality of substantially thermally insulated cells, each device in the plurality of devices configured, when activated, to protrude, or to depress; and
    an electrode layer comprising a plurality of electrodes corresponding to the plurality of thermal elements, the plurality of electrodes to activate a thermal element in the plurality of thermal elements and to activate a device in the plurality of devices.

16. The apparatus of claim 9, further comprising:
    a processor coupled to the haptic layer, the processor configured to send an instruction to the controller to activate at least one haptic element in the plurality of haptic elements, the instruction comprising an ID associated with at least two electrodes.

17. The apparatus of claim 16, wherein the instruction further comprises the instruction to protrude, or the instruction to depress.

18. The apparatus of claim 9, wherein the haptic element in the plurality of haptic elements comprises elastically deformable glass.

19. A method to create a relief associated with an electronic display, the method comprising:
    providing a haptic layer disposed proximate to an outer surface associated with the electronic display, the haptic layer comprising a plurality of haptic elements to create the relief associated with the electronic display, the relief comprising a depression or a protrusion on the electronic display, said providing the haptic layer comprising:
        providing a thin piezoelectric membrane configured to bend when a voltage is applied to the thin piezoelectric membrane;
        providing an anchor to support the thin piezoelectric membrane at a proximal end of the anchor, and the anchor to prevent the thin piezoelectric membrane from bending at points of contact;
        providing two electrodes in contact with the thin piezoelectric membrane to apply the voltage to the thin piezoelectric membrane without a third electrode disposed at a distal end of the anchor; and
    providing a controller coupled to the haptic layer, the controller to activate at least one haptic element in the plurality of haptic elements associated with the haptic layer.

20. The method of claim 19, said providing the haptic layer comprising:
providing a plurality of electrodes corresponding to the plurality of haptic elements, wherein activating at least two electrodes in the plurality of electrodes causes the corresponding one or more haptic elements to create at least one of the depression or the protrusion, wherein the plurality of electrodes are communicatively coupled to the controller.

21. The method of claim 19, said providing the haptic layer comprising:
providing a cover layer defining the outer surface associated with the electronic display, the cover layer comprising an elastically deformable material, the elastically deformable material to create the relief when activated.

22. The method of claim 19, said providing the haptic layer comprising:
providing a cover layer defining the outer surface associated with the electronic display, the cover layer comprising a plurality of substantially thermally insulated cells, each cell in the plurality of substantially thermally insulated cells comprising an elastically deformable material, the elastically deformable material to protrude in response to heat;
providing a thermal layer comprising a plurality of thermal elements, the plurality of thermal elements corresponding to the plurality of substantially thermally insulated cells, each thermal element in the plurality of thermal elements configured, when activated, to heat the corresponding thermally insulated cell; and
providing an electrode layer comprising a plurality of electrodes corresponding to the plurality of thermal elements, the plurality of electrodes to activate a thermal element in the plurality of thermal elements.

23. The method of claim 19, said providing the haptic layer comprising:
providing a device layer comprising a plurality of devices, each device in the plurality of devices configured, when activated, to protrude, or to depress;
providing a cover layer defining the outer surface associated with the electronic display, the cover layer coupled to the device layer, the cover layer to deform in response to the plurality of devices creating the relief; and
providing an electrode layer comprising a plurality of electrodes corresponding to the plurality of devices, the plurality of electrodes to activate a device in the plurality of devices.

24. The method of claim 19, said providing the haptic layer comprising:
providing a cover layer defining the outer surface associated with the electronic display, the cover layer comprising a plurality of substantially thermally insulated cells, each cell in the plurality of substantially thermally insulated cells comprising an elastically deformable material, the elastically deformable material to protrude in response to heat;
providing a thermal layer comprising a plurality of thermal elements, the plurality of thermal elements corresponding to the plurality of substantially thermally insulated cells, each thermal element in the plurality of thermal elements configured, when activated, to heat the corresponding thermally insulated cell;
providing a device layer comprising a plurality of devices, the plurality of devices corresponding to the plurality of substantially thermally insulated cells, each device in the plurality of devices configured, when activated, to protrude, or to depress; and
providing an electrode layer comprising a plurality of electrodes corresponding to the plurality of thermal elements, the plurality of electrodes to activate a thermal element in the plurality of thermal elements and to activate a device in the plurality of devices.

25. An apparatus comprising:
a haptic layer disposed proximate to an outer surface associated with an electronic display, the haptic layer comprising a plurality of haptic elements to create a relief associated with the electronic display, the relief comprising a depression or a protrusion on the electronic display, a haptic element in the plurality of haptic elements comprising:
a deformable membrane configured to bend when a voltage is applied to the deformable membrane;
an anchor to support the deformable membrane at a proximal end of the anchor, and the anchor to prevent the deformable membrane from bending at points of contact;
two electrodes in contact with the deformable membrane to apply the voltage to the deformable membrane without a third electrode disposed at a distal end of the anchor; and
a controller coupled to the haptic layer, the controller to activate at least one haptic element in the plurality of haptic elements associated with the haptic layer.

* * * * *